June 30, 1970 M. L. CUFFE ET AL 3,517,942
HIDE-AWAY STEP-UP DEVICE
Filed Aug. 1, 1968 2 Sheets-Sheet 1
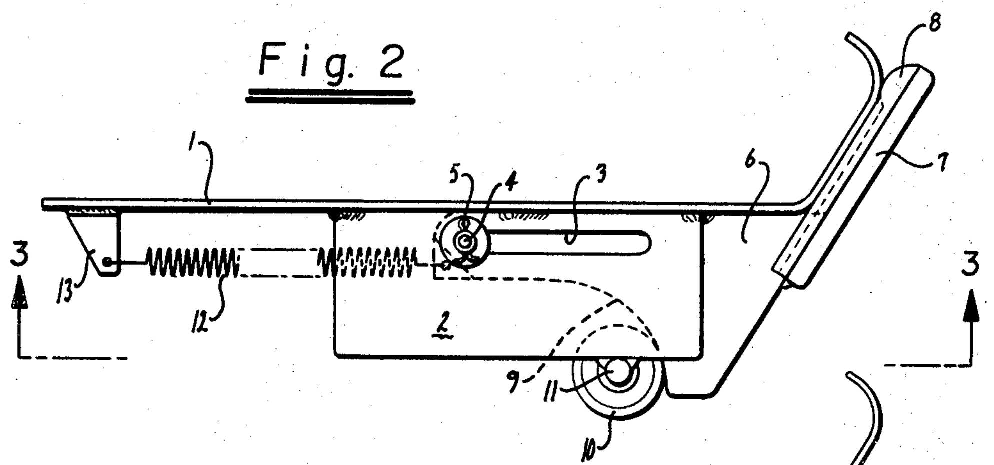
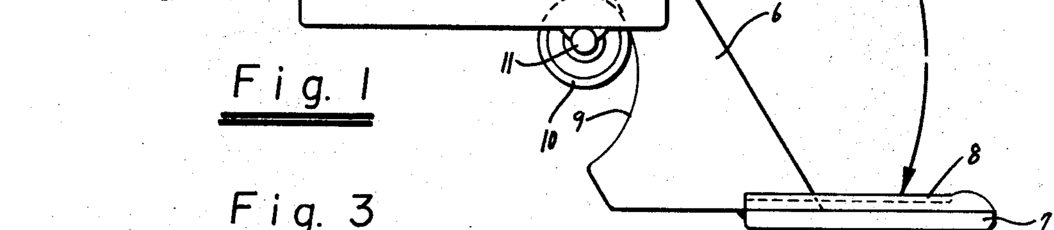
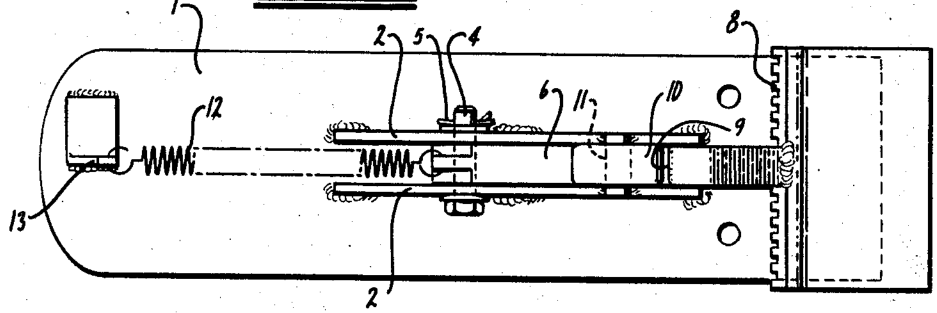
INVENTORS
Moses L. Cuffe
Ralph L. Frese
BY Alfons Puishes
Attorney HIDE-AWAY STEP-UP DEVICE
Filed Aug. 1, 1968 2 Sheets-Sheet 2
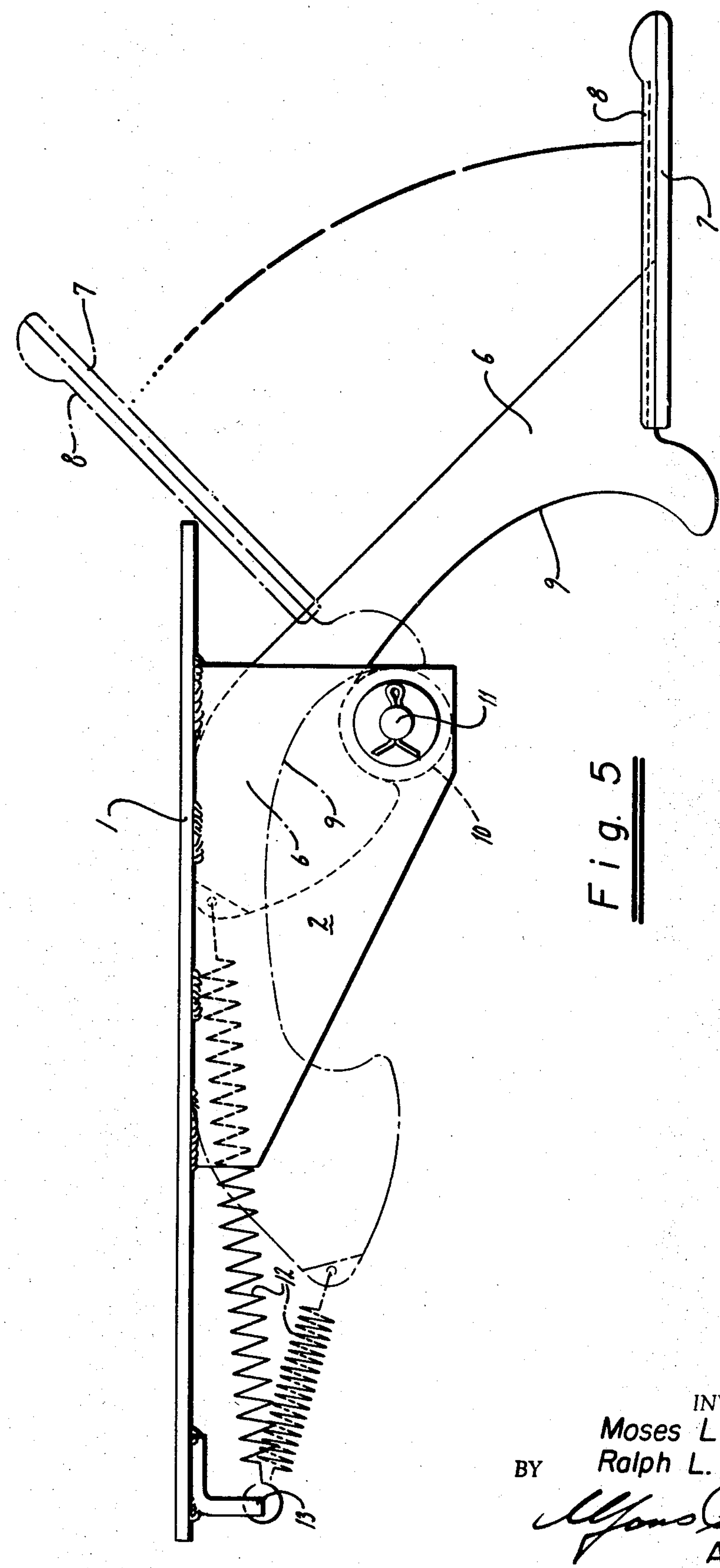
INVENTORS
Moses L. Cuffe
Ralph L. Frese
BY
Attorney United States Patent Office 3,517,942

Patented June 30, 1970

1

3,517,942

HIDE-AWAY STEP-UP DEVICE

Moses L. Cuffe, 715 Arastradero Road 94306, and Ralph L. Frese, 3109 Ross Road 94303, both of Palo Alto, Calif.

Filed Aug. 1, 1968, Ser. No. 749,330
Int. Cl. B60r 3/02
U.S. Cl. 280—166 2 Claims

ABSTRACT OF THE DISCLOSURE

An automatically rising and disappearing step-up device is permanently fixed to the running board rear end or other parts of motor vehicles such as trucks, station wagons, trailers, and campers. The combined action of pivot, slide guides, spring and cam provides positive movement of the step to a downward and horizontal position for safely mounting or boarding the vehicle and automatically returns it to an upward or vertical concealed position, free of interference when not in use.

BACKGROUND OF THE INVENTION

The widespread use of motor vehicles of the class known as trucks, station wagons, trailers, campers and so forth, presents the growing problem of providing safe and efficient access to the interior of these vehicles by passengers and other personnel. The level of the floor or interior of the body or compartments of these vehicles must of necessity be located a substantial distance above the ground, making the use of an intermediate step necessary. Portable steps resting on the ground have been used but these are not always readily available and frequently get lost or left behind. Steps permanently fixed to the vehicles have been used also but since these must project below the vehicle toward the ground, they represent a hazard, particularly when traveling over bumpy roads where they are frequently knocked off. They are also unsightly.

Means have been provided for manually raising and lowering a permanently attached step, but these are cumbersome, unsteady, and unsafe. When one forgets to raise such a step after use, it has all the aforesaid disadvantages of the stationary or fixed step, as set forth below.

SUMMARY

It is therefore an object of our invention to provide an access step for a motor vehicle which would be safe for the vehicle as well as for personnel using it.

It is another object of our invention to provide an access step for a motor vehicle which would substantially disappear from view when not in use.

It is a more specific object of our invention to provide an access step for a motor vehicle which can be readily lowered to the mounting position by use of the foot alone and would automatically rise to an upper or hidden position when not in use.

It is finally a general object of our invention to provide an access step for motor and similar vehicles which would overcome all the problems and disadvantages of existing access means.

We have discovered that we can permanently mount a movable or automatically retractable step on the running board, rear end or other part of a vehicle to which access is desired. We have discovered further that we can utilize a swinging arm to support our step and pivot said arm around a pin which in turn slides in horizontal guides fixed to the vehicle. A cam and roller gives positive action and horizontal motion to the swinging arm and hence the step. A spring engages the pin and acts to raise the arm and thereby the step automatically to the upper or hidden position when a person's weight is removed from the step.

2

DESCRIPTION OF THE DRAWINGS

FIG. 1 is a side elevation of our invention showing the step in a down or boarding position.

FIG. 2 is the view of FIG. 1 with the step in the up or hidden position.

FIG. 3 is a bottom view in the direction 3—3 of FIG. 2.

FIG. 4 shows the application of our invention to a camper or similar vehicle.

FIG. 5 is a side elevation of an alternate embodiment of our invention.

DESCRIPTION OF A PREFERRED EMBODIMENT

Referring now to the drawings, there is seen first an L shaped metal support plate 1 which may be permanently fastened to the running board or body of the vehicle by bolting, welding, or in any other suitable manner. A typical example is illustrated in FIG. 4.

To plate 1 there are welded guide blocks 2 in which are milled guide slots 3. Sliding pin 4 which may be of case-hardened steel rides in slots 3, is secured by washers and cotter pins 5, and acts also as a pivot for swinging arm 6.

Step 7 forms an integral part of arm 6 and may be equipped with a tread 8 of rubber or similar material.

The back surface of arm 6 has a curved configuration 9 which supplies a cam action as described more fully below. Roller 10 which may be of the anti-friction, permanently lubricated type, rides on pin 11 which is positioned on guide blocks 2 so that roller 10 rides between the guide blocks and bears against curved cam surface 9. A helical spring 12 which may be of chrome steel or similar material has one end engaging pin 4 and the other end positioned against support plate 1 by spring support 13.

OPERATION

Referring now more particularly to FIG. 2, our device is shown with its step 7 in its upper, closed or hidden position due to the combined action of spring 12, pin 4, guide slots 3 and arm 6. When access is desired the person places his toe against tread 8 and presses down. The combined action of pin 4 in slots 3 acting against tension of spring 12 and that of curved cam surface 9 against roller 10 then causes step 7 to travel transversely towards the person, as well as in an arc downward until it assumes the lower, horizontal or mounting position of FIG. 1. This in turn causes the person's foot to get a longer and firmer grip or tread 8 because of the horizontal movement of step 7 and facilitates his stepping up and into the vehicle. This is illustrated in FIG. 4.

After the person has stepped into the vehicle he releases the pressure on step 7 by removing his foot and the action of spring 12 combined with that of the rest of the mechanism described above causes step 7 to resume its original position shown in FIG. 2.

It should now be evident to those skilled in the art that while step 7 is in the horizontal position of FIG. 1 our device provides a rigid, safe and easy step for access to the vehicle. By automatically retracting step 7 to the vertical position of FIG. 2 our device conceals the step and removes any hazard to the vehicle which might result from step 7 remaining in the lowered position while the vehicle is in motion.

We claim:

1. A movable access step device for a vehicle body comprising:

a pair of parallel guide blocks fixedly positioned against said body;

horizontal guide slots in said blocks;

a pin slideably mounted in said slots;

a swinging arm pivotally mounted at one end thereof on said pin;

a step member fixedly positioned on the opposite end of said arm stop means positioned to hold said step member in a substantially vertical retracted position and an extended horizontal position;

a cam positioned on said arm, said cam having a inner concave surface;

a cam follower rotatably mounted on said guide blocks and engaging said concave surface of said cam;

a spring engaging said pin and said body;

said spring being disposed to bias said step member toward said retracted position;

tread means positioned on said step member to permit depressing said step member to a horizontal position under the combined action of said cam and said follower and against the tension of said spring.

2. A movable access step device positioned on a vehicle body comprising:

a horizontal support plate fixedly positioned on said vehicle body; a pair of guide plates fixedly positioned on said support plate;

a movable arm of generally arcuate configuration disposed for movement between said guide plates and having a step member fixedly positioned on one end;

an outer convex surface on said arm disposed for slideable relationship with the under side of said support plate;

an inner concave surface on said arm comprising a cam;

a cam follower positioned between said guide plates in fixed relationship to said support plate and engaging said inner concave surface of said cam;

spring means interposed between said support plate and the opposite end of said arm;

said spring means being disposed to simultaneously urge said outer curved surface against the under side of said support plate and said cam against said follower; stop means positioned to hold said step member in a substantially vertical spring biased retracted position and a horizontal operative position when a downward pressure is exerted on said step member.

References Cited

UNITED STATES PATENTS

| | | | |
|---|---|---|---|
| 315,833 | 4/1885 | Philbert | 182—89 |
| 2,487,660 | 11/1949 | McCann | 182—89 |
| 2,956,638 | 10/1960 | Bustin | 182—88 |
| 3,008,533 | 11/1961 | Haberle | 182—88 |

FOREIGN PATENTS 561,581 9/1957 Canada.

BENJAMIN HERSH, Primary Examiner

R. R. SONG, Assistant Examiner